United States Patent [19]

Mori et al.

[11] Patent Number: 4,507,663

[45] Date of Patent: Mar. 26, 1985

[54] AUTOMATIC DIRECTION FINDER

[75] Inventors: Kenzo Mori, Tokyo; Mikio Ozawa, Yokohama, both of Japan

[73] Assignee: Taiyo Musen Co. Ltd., Tokyo, Japan

[21] Appl. No.: 318,925

[22] Filed: Nov. 6, 1981

[30] Foreign Application Priority Data

Aug. 18, 1981 [JP] Japan .................................. 56-128186

[51] Int. Cl.³ .............................................. G01S 5/04
[52] U.S. Cl. ................................................... 343/440
[58] Field of Search ............... 343/423, 424, 440, 441, 343/449

[56] References Cited

U.S. PATENT DOCUMENTS 3,701,155 10/1972 Adams .................................. 343/423
4,306,240 12/1981 Yasuda ............................ 343/440 X
4,368,470 1/1983 Mori et al. ...................... 343/441 X Primary Examiner—T. H. Tubbesing
Attorney, Agent, or Firm—A. W. Breiner

[57] ABSTRACT

An automatic direction finder for automatically finding the arriving direction of electric waves by rotating a goniometer or the like with the use of a stepping motor is described. The stepping motor is controlled by means of a digital circuit using a reversible counter. The polarities of the phase of the output demodulated by a receiving circuit are detected in terms of the antinodes thereof.

2 Claims, 4 Drawing Figures

AUTOMATIC DIRECTION FINDER

BACKGROUND OF THE INVENTION

1. Field of the Invention

The present invention relates to a direction finder and, more particularly, to an automatic direction finder for automatically finding the arriving direction of electric waves by rotating a goniometer of the like with the use of a stepping motor.

2. Description of the Prior Art

In the case where the output of a directive antenna is to be fed to a goniometer, the directive antenna is rotated to automatically find the arriving direction of electric waves. In such case, in accordance with the prior art, the antenna or goniometer is driven by means of a servometer. However, since the servometer is driven by an analog signal, there arises a defect in that a hunting phenomenon is caused by fluctuations in phase to thereby prevent a stable indication in case the minimum matching point of the goniometer is to stand still as an angle indicating the arriving direction of the electric waves.

SUMMARY OF THE INVENTION

It is, therefore, an object of the present invention to provide an automatic direction finder which can ensure a stable indication without defect concomitant with the prior art.

According to the present invention, there is provided an automatic direction finder of the type in which a stepping motor is used to drive a goniometer or the like and is controlled by means of a digital circuit using a reversible counter, and in which the polarities of the phase of the output demodulated by a receiving circuit are detected in terms of the antinodes thereof.

BRIEF DESCRIPTION OF THE DRAWING

Other objects and advantages of the present invention will become apparent from the following description taken in conjunction with the accompanying drawing, in which.

DESCRIPTION OF THE PREFERRED EMBODIMENT

Figure 1:
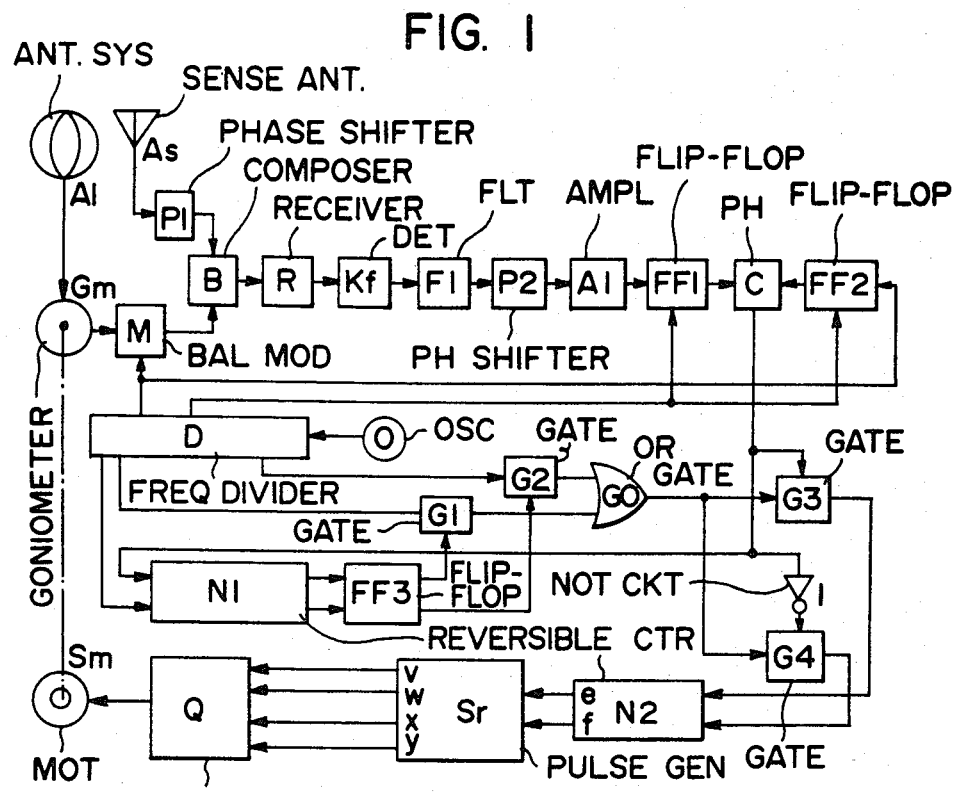
FIG. 1 is a block diagram showing the construction of an automatic direction finder embodying the present invention.

Referring to FIG. 1 showing the construction of the embodiment of the present invention, the output of an antenna system Al, in which two loop antennas having directivities are arranged in order that their directivities intersect at a right angle, is fed to a goniometer $G_m$, the output of which is fed to a balanced modulator M. On the other hand, the output of an oscillator O is fed to a frequency divider D to thereby extract a low-frequency output, for example an output of 135 Hz, which is fed to the aforementioned modulator M to thereby modulate the output of the goniometer $G_m$. Moreover, the output of a non-directive sense antenna $A_s$ is fed to a 90 degree phase shifter P1 so that the output of that phase shifter P1 and the output of the aforementioned balanced modulator M are composed by means of a composer B and are fed to a receiver R. "Composer B" as used herein is a means, as conventionally used in the art of describing a direction finder, for superimposing the respective outputs of non-directional components on directional components to develop a synthesized output which is free of ambiguity. At times composer B is referred to as an additive circuit. Since this receiver R feeds its composed input to a detector $K_f$ after it has amplified and converted the frequency of its input, the low-frequency signal is demodulated and fed to a filter F1 of 135 Hz. As a result, the aforementioned signal of 135 Hz is extracted and fed through a phase shifter P2 to an amplifier A1 in which it is amplified. Since that phase shifter P2 compensates the phase shift of the low-frequency signal of 135 Hz at the aforementioned receiver R or the like, the output of the amplifier A1 is either in phase with or in opposite phase to the modulating input to be fed to the modulator M if the latter has such a waveform as is shown in wave-form (a) of FIG. 2. The output of that amplifier A1 is shown in FIG. 2, wave-form (b), in case it is in phase.

Figure 2:
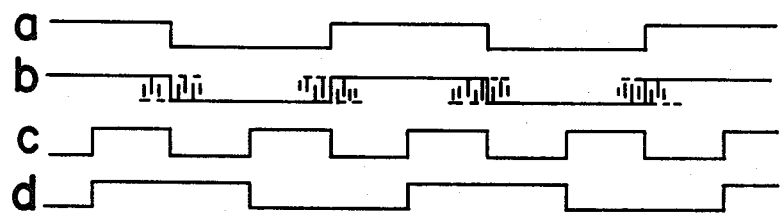
FIG. 2 shows wave-form charts illustrating the operations of a phase comparator shown in FIG. 1.

There are also provided in the system D flip-flops FF1 and FF2, which have their D inputs fed with the output of the aforementioned amplifier A1, i.e., either the signal shown in FIG. 2, wave-form (b), or the signal in opposite phase thereto and the reference signal shown in FIG. 2, wave-form (a), respectively, and the signal having a twice frequency of 270 Hz, which is extracted from the frequency divider D and which is synchronized with the reference signal of FIG. 2, wave-form (a), as their clock inputs. As a result, in case the output of the amplifier A1 is in phase with the reference signal, as shown in FIG. 2, wave-form (b), both the D flip-flops FF1 and FF2 feed out such outputs as are shown in FIG. 2, wave-form (d). On the other hand, in case the output of the amplifier A1 is in opposite phase to the signal shown in FIG. 2, wave-form (b), only the output of the D flip-flop FF1 becomes opposite in phase to the signal shown in FIG. 2, wave-form (d). Those two outputs are fed to a phase comparator C, which feeds out a signal "1" in case they are in phase and a signal "0" in case they are in opposite phase. More specifically, since the rising or breaking portion of the output signal of the amplifier A1 is so remarkably unstable as is shown in FIG. 2, wave-form (b), the detected output of the polarities of the phase of the aforementioned output signal becomes remarkably unstable, if that detection is conducted in dependence upon whether or not the rise or break coincides with the reference signal, so that the operations of the direction finder are not performed in a stable manner. According to the present invention, on the contrary, since the polarities of the antinodes of that output signal are compared with the reference signal, as shown in FIG. 2, wave-form (b), the phase comparator C can feed out a stable detected signal.

The output signal of the aforementioned phase comparator C is fed as an addition input to a reversible counter N1, and a signal having a suitable frequency such as 34 Hz is extracted from the aforementioned frequency divider D and is fed as a subtraction input to the reversible counter N1. A flip-flop FF3 is driven by the added and subtracted pulses of that reversible counter N1 to thereby control gates G1 and G2 by its output signals, and signals 100 Hz and 2.8 KHz are extracted from the frequency divider D and are fed to the aforementioned gates G1 and G2, the outputs of which are fed through an OR gate G0 to gates G3 and G4. As a result, if the comparator C continues feeding out only one of the signals "1" and "0", the reversible counter N1 feeds out only the subtracted pulses so that the gate G1 is closed but the gate G2 is opened by the flip-flop FF3, whereby high-speed pulses of 2.8 Hz are fed to the gates G3 and G4. On the other hand, if the rotational angle of the goniometer G comes close to the minimum matching point, the output level of the goniometer G is lowered, and the conversions between the output signals "1" and "0" of the comparator C are frequently conducted. If this conversion frequency becomes higher than the aforementioned frequency 34 Hz, the counter N1 feeds out the added pulses so that the flip-flop FF3 is inverted to open the gate G1 and to close the gate G2, whereby the low-frequency pulses of 100 Hz are fed to the gates G3 and G4.

Figure 3:
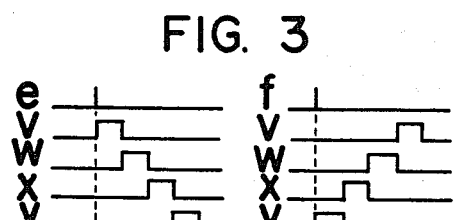
FIG. 3 shows wave-form charts illustrating pulses for driving a stepping motor as shown in FIG. 1.
Figure 4:
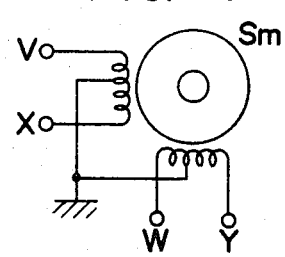
FIG. 4 is a circuit diagram showing the stepping motor shown in FIG. 1.

In addition, both the output signal of the phase comparator C and the signal, which is prepared by conditioning the former signal with the use of a NOT circuit I, are fed as control signals to the aforementioned gates G3 and G4. As a result, if the signal of 135 Hz, which has been demodulated by a receiving circuit including the receiver R, the detector $K_f$, the filter F1 and the phase shifter P1, has a positive phase, the gate G3 is opened; whereas the gate G4 is opened if the same signal has the opposite phase, so that the output pulses of the gates G3 and G4 are fed as addition and subtraction inputs, respectively, to a reversible counter N2. Both the added and subtracted pulses of that reversible counter N2, as shown in FIG. 3, pulses (e) and (f), respectively, are fed to a pulse generator $S_r$. If this generator $S_r$ is fed with the added pulses (e), its four output terminals indicated at (v), (w), (x), and (y) feed out output pulses in this order. On the contrary, if the generator $S_r$ is fed with the subtracted pulses (f), its respective terminals feed out output pulses in the opposite order. Since those output pulses are fed through a drive circuit Q to the respective drive winding terminals V, W, X and Y of a stepping motor $S_m$, as shown in FIG. 4, this motor $S_m$ is rotated a predetermined angle clockwise, if the counter N2 feeds out the added pulses (e), and the same angle counter-clockwise if the counter N2 feeds out the subtracted pulses (f). The goniometer $G_m$ is driven by those rotations.

As a result, under the condition where the goniometer $G_m$ fails to indicate the arriving direction of electric waves, either the signal "1" or "0" is stably fed out of the phase comparator C, as has been described hereinbefore, so that the high-speed pulses are fed as the added or subtracted input to the reversible counter N2. Hence, either the added or subtracted pulses are fed out of the aforementioned counter N2 so that the motor $S_m$ is rotated clockwise or counter-clockwise at a relatively high speed, whereby the goniometer $G_m$ promptly comes close to the minimum matching point to thereby reduce the demodulated output of the receiving circuit. At the same time, if the minimum matching point is passed over, the output signal of the phase comparator C is inverted. As a result, this comparator C alternately feeds out the signals "1" and "0" so that the input pulses of the counter N2 are switched to have the low speed. As has been described hereinbefore, the phase comparator C itself can stably operate without being influenced by noise components because it compares the polarities of the antinodes at the demodulated output of the receiving circuit with the reference signal thereby to discriminate the polarities of the phase. As a result, the addition or subtraction input of the counter N2 accurately accords with the aforementioned polarities of the phase so that the goniometer $G_m$ is rotated stably and reliably in a predetermined direction. Moreover, the rotational speed of the goniometer $G_m$ can be set at a proper value by suitably selecting the frequencies of the low- and high-speed pulses to be fed to the gates G1 and G2. Further, if the phase comparator C starts to alternately feed out the signals "1" and "0" over a substantially constant period, the addition and subtraction inputs are alternately fed to the counter N2 so that neither the added pulses nor the subtracted pulses are continued to be fed out of said counter. As a result, the goniometer $G_m$ stands still at a predetermined position to thereby stably indicate the arriving direction of the electric waves, i.e., the direction of the minimum matching point.

In the embodiment thus far described, the antinodes of the azimuthal signal are detected by the use of the signal having a frequency twice as high as the modulated frequency. Nevertheless, the antinodes of the output signal of the amplifier A1 can be detected, too, by the use of the rise and break of the signal having the modulated frequency. In this modification, the D flip-flop FF2 is omitted, and the signal having the modulated frequency is fed to the comparator C.

As has been described hereinbefore, the automatic direction finder according to the present invention discriminates the phase of the demodulated output of its receiving circuit in accordance with the polarities of the antinodes thereof. As a result, even in case the arriving direction of the electric waves is indicated so that the demodulated output has its amplitude remarkably reduced, the aforementioned discrimination of the polarities can be stably performed. Moreover, the influences of the frequent and periodic conversions of the polarities can be removed by the reversible counter N2. As a result, any vibratory defects which occur with the arrival of the electric waves occurs in a pointer or in the digital display of the azimuth, thereby still obtaining a stable indication.

As will be apparent to one skilled in the art, various modifications can be made within the scope of the aforesaid description. Such modifications being within the ability of one skilled in the art form a part of the present invention and are embraced by the appended claims.

It is claimed:

1. An automatic direction finder comprising:
   a directive antenna system;
   a non-directive antenna system;
   a stepping motor for rotating the directivity of said directive antenna system;
   a receiving circuit for receiving a signal from a balanced modulator, said signal having been prepared by the balancing and modulating of one of the outputs of said directive antenna system and a non-directive antenna by means of a low-frequency signal and by composing the said balanced and modulated output and the other output, for demodulating said low-frequency signal;
   a phase-detecting circuit for comparing the polarities of the antinodes of the output signal of said receiving circuit to detect the polarities of the phase of said output signal;

a reversible counter for adding or subtracting clock pulses in accordance with the output signal of said phase-detecting circuit; and a motor-driving circuit for rotating said stepping motor a predetermined angle clockwise or counterclockwise in accordance with the added or subtracted pulses of said reversible counter.

2. An automatic direction finder according to claim 1, including means for changing the period of the clock pulses to be fed to said reversible counter in accordance with the reversing frequency of the output signal of said phase-detecting circuit.

* * * * *